(12) United States Patent
Fischer

(10) Patent No.: US 12,482,264 B2
(45) Date of Patent: Nov. 25, 2025

(54) SYSTEM AND METHOD FOR ENGAGEMENT MANAGEMENT

(71) Applicant: Brandon Fischer, Carmel, IN (US)

(72) Inventor: Brandon Fischer, Carmel, IN (US)

( * ) Notice: Subject to any disclaimer, the term of this patent is extended or adjusted under 35 U.S.C. 154(b) by 233 days.

(21) Appl. No.: 18/176,153

(22) Filed: Feb. 28, 2023

(65) Prior Publication Data

US 2023/0281996 A1    Sep. 7, 2023

Related U.S. Application Data

(60) Provisional application No. 63/268,942, filed on Mar. 7, 2022.

(51) Int. Cl.
| | |
|---|---|
| *G06V 20/52* | (2022.01) |
| *G06F 3/14* | (2006.01) |
| *G06V 40/20* | (2022.01) |
| *G10L 25/57* | (2013.01) |
| *H04L 65/1069* | (2022.01) |

(52) U.S. Cl.
CPC ............ *G06V 20/52* (2022.01); *G06F 3/1454* (2013.01); *G06V 40/20* (2022.01); *G10L 25/57* (2013.01); *H04L 65/1069* (2013.01)

(58) Field of Classification Search
CPC ...... G06V 20/52; G06V 40/20; G06V 40/174; G06F 3/1454; G10L 25/57; H04L 65/1069; H04L 65/403; H04L 65/4015; G09G 2354/00; H04N 7/15; H04N 21/2187; H04N 21/44218; H04N 21/42203; H04N 21/4788
See application file for complete search history.

(56) References Cited

U.S. PATENT DOCUMENTS

| | | | |
|---|---|---|---|
| 9,525,952 B2 * | 12/2016 | Bowden ............ | H04N 21/44218 |
| 2013/0258042 A1 * | 10/2013 | Shun ...................... | H04N 7/152 |
| | | | 348/E7.083 |
| 2016/0073054 A1 * | 3/2016 | Balasaygun ........ | H04L 12/1822 |
| | | | 348/14.08 |
| 2022/0078366 A1 * | 3/2022 | Dasdan ................... | G06V 20/40 |
| 2022/0174099 A1 * | 6/2022 | Wilkins ............... | G06V 40/174 |

* cited by examiner

*Primary Examiner* — Stella L. Woo
(74) *Attorney, Agent, or Firm* — ICE MILLER LLP

(57) ABSTRACT

A communication system and a computer-implemented method for providing a screenshare to one or more computing devices as a live share. In embodiments of the communication solution, a communication system and a computer-implemented method are configured to provide the screenshare to the one or more computing devices in the live share and, contemporaneously, monitor participant engagement at one or more of the computing devices during the live share. The communication system and computer-implemented method can be configured to provide engagement metrics in real-time based on the monitored participant engagement.

11 Claims, 4 Drawing Sheets

SYSTEM AND METHOD FOR ENGAGEMENT MANAGEMENT

CROSS REFERENCE TO PRIOR APPLICATION

This application claims priority to, and the benefit thereof, provisional U.S. patent application, Ser. No. 63/268,942, filed on Mar. 7, 2022, titled "System and Method for Engagement Management," the entirety of which is hereby incorporated herein by reference as if fully set forth herein.

FIELD OF THE DISCLOSURE

The present disclosure relates to a system and a computer-implemented method for providing a screenshare to a computing device in a live share session, and, more particularly, to a system and a computer-implemented method for monitoring participant engagement at the computing device during the live share session and providing engagement metrics in real-time.

BACKGROUND OF THE DISCLOSURE

In a computer networked environment such as the Internet, videoconferencing is commonly used for the reception and transmission of audio-video (AV) content by users in different locations, for communication between people in real-time. Videoconferencing systems, such as, for example, ZOOM, Microsoft TEAMS, and Webex, are commonly used to facilitate AV content exchange amongst multiple users. While such videoconferencing systems can provide users with an ability to live share AV content, such systems are not capable of monitoring participant engagement during a live share session. There exists an unfulfilled need for a communication solution that can monitor participant engagement and provide engagement metrics in real-time.

SUMMARY OF THE DISCLOSURE

The present disclosure provides a communication solution for providing a screenshare to one or more computing devices as a live share. In various embodiments of the communication solution, a communication system and a computer-implemented method are configured to provide the screenshare to the one or more computing devices in a live share session and, contemporaneously, monitor participant engagement at one or more of the computing devices during the live share session. The communication system and computer-implemented method can be configured to provide engagement metrics in real-time based on the monitored participant engagement.

In an embodiment of the disclosure, a communication system is provided for a live share session comprising a screenshare that includes audio-video content from one or more participating computing devices. The system comprises a receiver configured to receive a first live audio-video content feed from a first participating computing device and a second live audio-video content feed from a second participating computing device, and a processor communicatively coupled to the receiver, the processor being configured to: initiate, by a live share creator, a live share session that includes the first live audio-video content feed and the second live audio-video content feed; analyze, by a live share monitor, video content in at least one of the first live audio-video content feed and the second live audio-video content feed against a visual engagement baseline; calculate, by the live share monitor, a video cue metric based on the visual engagement baseline; and a transmitter communicatively coupled to the processor, wherein the transmitter is configured to packetize and send the video cue metric and at least one of the first audio-video content feeds and the second audio-video content feeds to a communicating device.

In the communication system: the communicating device can comprise a third participating computing device; or the communicating device can comprise the first participating computing device; or the processor can be configured to: analyze, by the live share monitor, audio content in at least one of the first live audio-video content feed and the second live audio-video content feed against an audio engagement baseline; calculate, by the live share monitor, an audio cue metric based on the audio engagement baseline; and the transmitter being configured to packetize and send the audio cue metric to the communicating device.

In the communication system, the processor can be configured to: analyze, by the live share monitor, tactile activity associated with at least one of the first live audio-video content feed and the second live audio-video content feed against a tactile engagement baseline; calculate, by the live share monitor, a tactile interactivity cue metric based on the tactile engagement baseline; and the transmitter being configured to packetize and send the tactile interactivity cue metric to the communicating device.

In the communication system in claim 1, the processor can be configured to: analyze, by the live share monitor, audio content in at least one of the first live audio-video content feed and the second live audio-video content feed against an audio engagement baseline; analyze, by the live share monitor, tactile activity associated with at least one of the first live audio-video content feed and the second live audio-video content feed against a tactile engagement baseline; calculate, by the live share monitor, an audio cue metric based on the audio engagement baseline and a tactile interactivity cue metric based on the tactile engagement baseline; and the transmitter being configured to packetize and send the audio cue metric and tactile interactivity cue with the video cue metric to the communicating device.

In the communication system, the processor is configured to generate, by the screenshare renderer, engagement level rendering instructions and engagement level rendering data; and the transmitter is configured to packetize and send the engagement level rendering instructions and the engagement level rendering data to the communicating device to display at least one of the video cue metric, the audio cue metric, and the tactile interactivity metric.

In an embodiment of the disclosure, a computer-implemented method is provided for a live share session comprising a screenshare that includes live audio-video content from one or more participant computing devices. The method comprises: receiving a first live audio-video content feed from a first participating computing device and a second live audio-video content feed from a second participating computing device; initiating, by a live share creator, a live share session that includes at least one the first live audio-video content feed and the second live audio-video content feed; analyzing, by a live share monitor, video content in at least one of the first live audio-video content feed and the second live audio-video content feed against a visual engagement baseline; calculating, by the live share monitor, a video cue metric based on the visual engagement baseline; and transmitting the video cue metric and at least one of the first audio-video content feeds and the second audio-video content feeds to a communicating device.

In the computer-implemented method: the communicating device comprises the first participating computing device; or the communicating device comprises a third participating computing device.

The computer-implemented method can further comprise: analyzing, by the live share monitor, audio content in at least one of the first live audio-video content feed and the second live audio-video content feed against an audio engagement baseline; calculating, by the live share monitor, an audio cue metric based on the audio engagement baseline; and transmitting the audio cue metric with the video cue metric to the communicating device.

The computer-implemented method can further comprise: analyzing, by the live share monitor, tactile activity associated with at least one of the first live audio-video content feed and the second live audio-video content feed against a tactile engagement baseline; calculating, by the live share monitor, a tactile interactivity cue metric based on the tactile engagement baseline; and transmitting the tactile interactivity cue metric with video cue metric to the communicating device.

The computer-implemented method can further comprise: analyzing, by the live share monitor, audio content in at least one of the first live audio-video content feed and the second live audio-video content feed against an audio engagement baseline; analyzing, by the live share monitor, tactile activity associated with at least one of the first live audio-video content feed and the second live audio-video content feed against a tactile engagement baseline; calculating, by the live share monitor, an audio cue metric based on the audio engagement baseline and a tactile interactivity cue metric based on the tactile engagement baseline; and transmitter being configured to packetize and send the audio cue metric and tactile interactivity cue with the video cue metric to the communicating device.

The computer-implemented method can further comprise: generating, by the screenshare renderer, engagement level rendering instructions and engagement level rendering data; and transmitting the engagement level rendering instructions and the engagement level rendering data to the communicating device to display at least one of the video cue metric, the audio cue metric, and the tactile interactivity metric.

In an embodiment of the disclosure, a non-transitory computer-readable medium is provided for a live share session comprising a screenshare that includes live audio-video content from one or more participant computing devices, the computer-readable medium comprising instructions that, when executed by a processor, cause the processor to perform a method comprising: receiving a first live audio-video content feed from a first participating computing device and a second live audio-video content feed from a second participating computing device; initiating, by a live share creator, a live share session that includes at least one the first live audio-video content feed and the second live audio-video content feed; analyzing, by a live share monitor, video content in at least one of the first live audio-video content feed and the second live audio-video content feed against a visual engagement baseline; calculating, by the live share monitor, a video cue metric based on the visual engagement baseline; and transmitting the video cue metric and at least one of the first audio-video content feeds and the second audio-video content feeds to a communicating device.

In the non-transitory computer-readable medium, the communicating device can comprise the first participating computing device or a third participating computing device.

In the non-transitory computer-readable medium, the method can further comprise: analyzing, by the live share monitor, audio content in at least one of the first live audio-video content feed and the second live audio-video content feed against an audio engagement baseline; calculating, by the live share monitor, an audio cue metric based on the audio engagement baseline; and transmitting the audio cue metric with the video cue metric to the communicating device.

In the non-transitory computer-readable medium, the method can further comprise: analyzing, by the live share monitor, tactile activity associated with at least one of the first live audio-video content feed and the second live audio-video content feed against a tactile engagement baseline; calculating, by the live share monitor, a tactile interactivity cue metric based on the tactile engagement baseline; and transmitting the tactile interactivity cue metric with video cue metric to the communicating device.

In the non-transitory computer-readable medium, the method can further comprise: analyzing, by the live share monitor, audio content in at least one of the first live audio-video content feed and the second live audio-video content feed against an audio engagement baseline; analyzing, by the live share monitor, tactile activity associated with at least one of the first live audio-video content feed and the second live audio-video content feed against a tactile engagement baseline; calculating, by the live share monitor, an audio cue metric based on the audio engagement baseline and a tactile interactivity cue metric based on the tactile engagement baseline; and transmitter being configured to packetize and send the audio cue metric and tactile interactivity cue with the video cue metric to the communicating device.

In the non-transitory computer-readable medium, the method can further comprise: generating, by the screenshare renderer, engagement level rendering instructions and engagement level rendering data; and transmitting the engagement level rendering instructions and the engagement level rendering data to the communicating device to display at least one of the video cue metric, the audio cue metric, and the tactile interactivity metric.

Additional features, advantages, and embodiments of the disclosure may be set forth or apparent from consideration of the detailed description and drawings. Moreover, it is to be understood that the foregoing summary of the disclosure and the following detailed description and drawings provide nonlimiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure.

Figure 1:
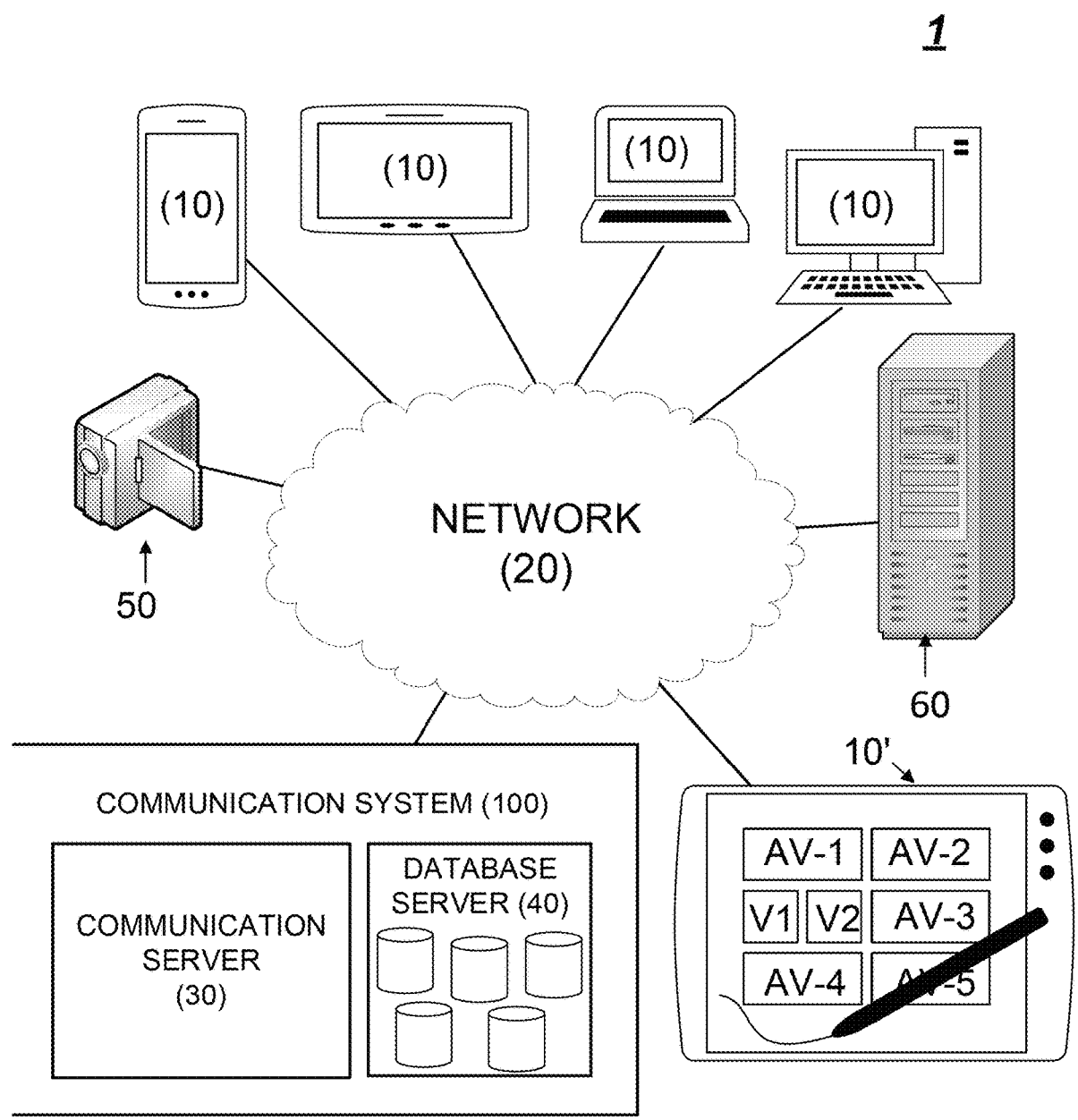
FIG. 1 depicts an implementation of a communication system in a user environment, arranged according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It is noted that features illustrated in the drawings are not necessarily drawn to scale, and features of one embodiment can be employed with other embodiments, as those skilled in the art will recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

In state-of-the-art videoconference systems, when a screenshare is shared between two or more computing devices in a live share session, a participant involved in the live share session can, using the participant's eyes and ears, monitor and assess engagement of other participants in the screenshare based on visual and sound cues for each participant, including, for example, to see and judge whether or when participants are paying attention. This, however, can be incredibly difficult or, for practical purposes, impossible to do when, for example, the participant is presenting (for example, a document such as a PowerPoint presentation) during the screenshare, or the live share session includes a large number of participants (for example, five, ten, or more participants). Existing technology can be used to provide clues regarding whether and when participants are attentive, or not, but state-of-the art screenshare technologies do not include such technology and, moreover, do not include any technology that can monitor or assess participant engagement during a live share session.

In various embodiments of the communication solution, a communication system is provided that can provide one or more live AV content feeds to one or more computing devices as a live screenshare. The communication system is configured to monitor participant engagement in a live share session and generate engagement metrics in real-time. The communication system can monitor participant engagement and determine a level of participant engagement in real-time for each participant in the session. The communication system can be arranged to render engagement metrics in the screenshare for any of the participants in the live share session, which can be rendered on the display devices of any of the participating computing devices.

In various embodiments, the communication system can be configured to monitor participant engagement at a computing device, even if the camera, microphone, or both are turned off, or disconnected from the computing device.

In an embodiment, the communication system can be arranged to monitor each participant at a computing device and generate engagement metrics, including engagement level rendering instructions and engagement level data for each participant. The engagement metrics can be stored in an engagement metrics rendering file. The engagement level rendering instructions can include, for example, computer-executable instructions and rendering data. The engagement metrics can include, for example, Hyper Text Markup Language (HTML), Cascading Style Sheets (CSS) and scripting languages such as, for example, JavaScript. The HTML code can include, for example, HTML 2, HTML 3, HTML 5, XHTML or any variation of HTML. The engagement level rendering instructions can include computer-executable code comprising instructions that, when executed by a processor, cause the processor to process the rendering data and display the engagement level for any participant in the live share session. In an embodiment, the communication system can include a screenshare renderer 180 (shown in FIG. 2), which, as discussed below, can be configured to generate and send engagement level rendering instructions and engagement level rendering data for each participant to any one or more computing devices participating in a live share session.

FIG. 1 is a block diagram depicting an implementation of an embodiment of a communication system 100 in an environment 1. The environment 1 can include, in addition to the communication system 100, a plurality of computing devices 10 and a network 20. The environment 1 can include one or more sensors, such as, for example, a sound and image pickup device 50, which can include, for example, a still camera, a video camera, a smartphone camera, or any computing device capable of capturing and transmitting a still or moving image signal, as well as sound. The environment 1 can include a live audio-video (AV) content feed computer resource asset 60, such as, for example, a communication server of a multimedia content provider. The computer resource asset 60 can include a source of live AV content feed, such as, for example, a webpage, a document, or anything that can be displayed or reproduced by the computing devices 10.

The computing device 10 can include, or it can be coupled to, to one or more sensors, such as, for example, an image pickup device, a sound pickup device, a motion sensor, or an audio-video (AV) pickup device. The sensor can include, for example, a high-definition video camera and microphone, to capture sound and video in proximity to the computing device 10, such as speech and images of the participant. The computing device 10 can include a communicating device such as, for example, a cellphone, a smartphone, a computer tablet, a laptop computer, a desktop computer, a workstation, or any communicating device capable of rendering one or more live AV content feeds, such as, for example, live AV content feeds AV-1, AV-2, AV-3, AV-4 or AV-5 (shown in FIG. 1), each of which can originate from a respective one of the computing devices 10. The computing device 10 can be arranged to render sound and video content received from the computer resource asset 60, such as, for example, video content V1 and V2.

In the embodiment depicted in FIG. 1, the communication system 100 includes a communication server 30 and a database server 40. In an embodiment, the communication system 100 can include a communication device architecture, such as, for example, depicted in FIG. 2.

Figure 2:
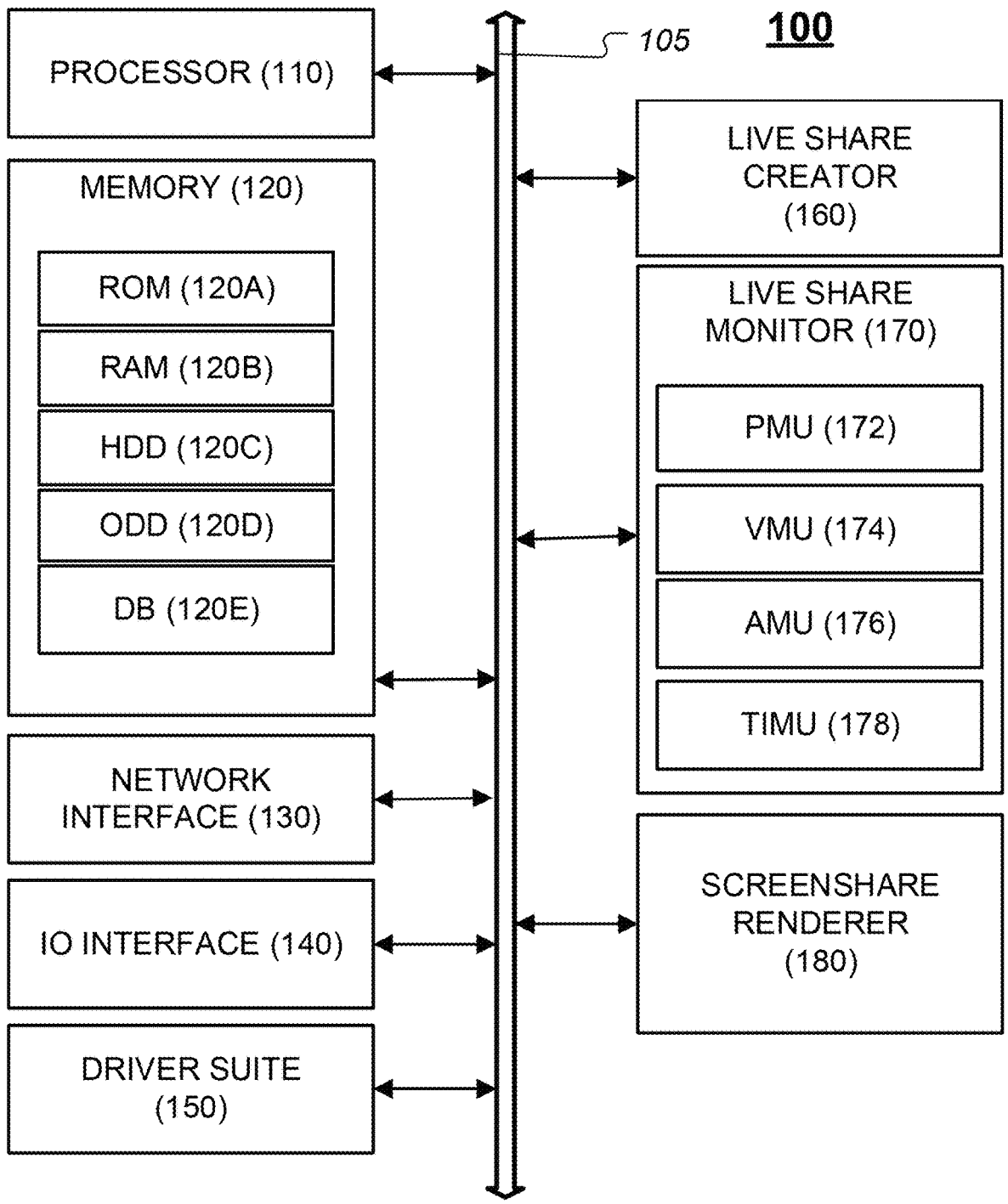
FIG. 2 depicts a nonlimiting embodiment of a communication system, constructed according to the principles of the disclosure.

FIG. 2 depicts an embodiment of the communication system 100, arranged according to the principles of the disclosure. The communication system 100 can include a plurality of computer resource assets, including a bus 105, a processor 110, a memory 120, a network interface 130, an input-output (IO) interface 140, a driver suite 150, a live share creator 160, a live share monitor 170, and a screen-share renderer 180. Any of the computer resources assets 110 to 180 can be interconnected using various communication links, including buses, and can be mounted on a common motherboard or in another manner, as appropriate.

In various embodiments, the communication system 100 can be provided as a separate suite of computer resource assets, as seen, for example, in FIG. 1, independent from any of the computing devices 10.

In at least one embodiment, the communication system 100 can be provided in any one or more of the computing devices 10.

The processor 110 can be arranged to execute instructions and process data within the communication system 100, including instructions stored in the memory 120. The processor 110 can be configured to execute engagement level rendering instructions and process engagement level rendering data. The processor 110 can be arranged to generate and send or display graphical information for a graphic user interface (GUI) on a display screen, including, for example, an external input/output computer resource asset, such as, for example, the computing device 10 (shown in FIG. 1), which can be coupled to the communication system 100 via a communication link, such as, for example, over the network 20.

In various embodiments, the processor 110 can be configured to execute the engagement level rendering instructions and process engagement level rendering data to interact with and control an audio driver to reproduce sound signals, such as, for example, on a speaker device in the computing device 10.

In other implementations, multiple processors or multiple buses can be used, as appropriate, along with multiple memories and types of memory. The communication system 100 can be connected with any computer resource asset in the environment 1 (shown in FIG. 1) and arranged to provide portions of the necessary operations, such as, for example, as a server bank, a group of blade servers, or a multi-processor system.

The processor 110 can include any of various commercially available processors. The processor 110 can include a computing device. Dual microprocessors and other multi-processor architectures can be employed as the processor 110. The processor 110 can include a central processing unit (CPU) or a graphic processing unit (GPU). The processor 110 can be arranged to interact with any of the computer resource assets in the communication system 100 to carry out or facilitate with the processes described herein.

The bus 105 can include any of several types of bus structures that can further interconnect to a memory bus (with or without a memory controller), a peripheral bus, and a local bus using any of a variety of commercially available bus architectures.

The memory 120 can include a read-only memory (ROM) 120A, a random-access memory (RAM) 120B, a hard disk drive (HDD) 120C, an optical disk drive (ODD) 120D, and a database (DB) 120E. The memory 120 can provide non-volatile storage of data, data structures, and computer-executable instructions, and can accommodate the storage of any data in a suitable digital format. The memory 120 can include a computer-readable medium that can hold executable or interpretable computer code (instructions) that, when executed by the processor 110, cause the steps, processes and methods of the various embodiments in this disclosure to be carried out. The computer-readable medium can be contained in the memory 120, and can include sections of computer code that, when executed by the processor 110, cause the communication system 100 to monitor engagement of each participant in a live share session and generate engagement metrics in real-time for each participant, and a grouping of the participants.

A basic input-output system (BIOS) can be stored in the ROM 120A, which can include, for example, a non-volatile memory, an erasable programmable read-only memory (EPROM), or an electrically erasable programmable read-only memory (EEPROM). The BIOS can contain the basic routines that help to transfer information between any one or more of the computing resource assets in the communication system 100, such as during start-up.

The RAM 120B can include dynamic random-access memory (DRAM), a synchronous dynamic random-access memory (SDRAM), a static random-access memory (SRAM), a nonvolatile random-access memory (NVRAM), or another high-speed RAM for caching data.

The HDD 120C can include, for example, an enhanced integrated drive electronics (EIDE) drive, a serial advanced technology attachments (SATA) drive, or any suitable hard disk drive for use with big data. The HDD 120C can be configured for external use in a suitable chassis (not shown).

The ODD 120D can be arranged to read or write from, or to, a compact disk (CD)-ROM disk (not shown), or, read from, or write to, other high capacity optical media such as a digital versatile disk (DVD).

The HDD 120C or ODD 120D can be connected to the bus 105 by a hard disk drive interface (not shown) and an optical drive interface (not shown), respectively. The hard disk drive interface (not shown) can include, for example, a Universal Serial Bus (USB) (not shown), an IEEE 1394 interface (not shown), and the like, for external applications.

The DB 120E can include one or more databases, including, for example, one or more relational databases. The DB 120E can store machine learning (ML) training datasets and ML testing datasets for building and training a machine learning (ML) model. In various embodiments, the communication system 100 can include a machine learning platform that can be configured to build a machine learning model and train the ML model to perform the operations disclosed herein.

The ML model can be trained to analyze sensor data received from one or more sensors, including, for example, vision sensors (such as, for example, optical solid state sensors, digital cameras, computer cameras, infrared (IR) cameras, or the like), audio sensors (such as, for example, microphones, computer microphones, or the like), tactile sensors (such as, for example, touchscreen, piezoresistive, piezoelectric, optical, capacitive, elastoresistive, or the like), or olfactory sensors (such as, for example, an electronic nose devices, chemosensors, gas chromatography sensor, or the like).

In various embodiments, the ML model can be built and trained to receive audio-video (AV) content or tactile inter-activity on-the-fly and identify, in real-time, participant behavior and level of engagement in a live share session, including, for example, facial analysis (including, for example, spatial orientation, eye-tracking and facial expression) to determine whether a participant is engaged in the live share session, and the level of engagement by that participant, such as, for example, whether the participant is distracted, inattentive, attentive, paying attention, interacting with the screenshare, or manifesting any recognizable action or behavior at the computing device 10.

The ML model can be loaded, for example, in the RAM 120B, and run by the processor 110 executing computer resource processes on the ML platform. The training datasets can be updated periodically (or, in at least one embodiment, continuously) with updated parametric values, such as, for example, during parametric tuning of the ML model.

The memory 120 can be arranged to provide mass storage, for example, in the HDD 120C or DB 120E. The memory 120 can include the database server storage 40 (shown in FIG. 2). The memory 120 can contain a computer-readable medium, such as a solid-state drive (SSD), a hard disk device, an optical disk device, a flash memory or other similar solid-state memory device, or an array of devices, including devices in a storage area network or other configurations.

A computer program product can be tangibly embodied in a non-transitory computer-readable medium, which can be contained in the memory 120, or provided as an external computer resource asset and connected to the bus 105 (shown in FIG. 1). The computer program product can contain instructions that, when executed, perform one or more methods or operations, such as those included in this disclosure. The computer-readable medium can include an information carrier such as the memory 120 or memory on processor 110.

Any number of computer resources can be stored in the memory 120, including, for example, a program module, an operating system, an application program, an application program interface (API), or program data. The computing resource can include an API such as, for example, a web API, a simple object access protocol (SOAP) API, a remote procedure call (RPC) API, a representation state transfer (REST) API, or any other utility or service API. Any (or all) of the operating system, application programs, APIs, program modules, and program data can be cached in the RAM 120B as executable sections of computer code.

The API can include an API for a markup language such as, for example, SGML, SVG, HTML, XHTML/XML), XUL, or LaTeX.

The API can include an API for a style sheet language, such as, for example, CSS, DSSSL, or XSL. The API can include a web-based API, an operating system API, a database system API, a computer hardware API, or a library API. The API can include, for example, one or more of the APIs available at <<https://developers.google.com>>.

The API can include one or more APIs that connect webpages to scripts or programing languages, including modelling (for example, SGML, SVG, HTML, XHTML/XML, XUL) documents as objects.

The API can include a document object model (DOM) API, such as for HTML or XML (for example, DOM5 HTML), that can create object-oriented representations of AV content that can be modified with a scripting module (not shown). A DOM can include a cross-platform and language-independent convention for representing and interacting with objects in HTML, XHTML/XML, SGML, SVG, or XUL.

The network interface 130 can be connected to the network 20 (shown in FIG. 1), which can include the Internet. The network interface 130 can include a wired or a wireless communication network interface (not shown) or a modem (not shown). When used in a local area network (LAN), the communication system 100 can be connected to the LAN network through the wired or wireless communication network interface; and, when used in a wide area network (WAN), the communication system 100 can be connected to the WAN network through the modem. The modem (not shown) can be internal or external and wired or wireless. The modem can be connected to the system bus 105 via, for example, a serial port interface (not shown). The network interface 130 can include a receiver (not shown), a transmitter (not shown) or a transceiver (not shown).

In various embodiments, the transceiver (transmitter and receiver) can be communicatively coupled to the screenshare render 180 and configured to communicate and interact with the screenshare renderer 180 to assemble AV content from any of the participant computing devices into a video screenshare, packetize the video screenshare, and send the packetized video screenshare to the any one or more of the participating computing devices.

In various embodiments, the transceiver can be communicatively coupled to the processor 110 and configured to interact with the processor 110, including to exchange computer-executable instructions and data.

The input-output (IO) interface 140 can receive commands or data from an operator via a user interface (not shown), such as, for example, a keyboard (not shown), a mouse (not shown), a pointer (not shown), a stylus (not shown), a microphone (not shown), a speaker (not shown), or a display device (not shown). The received commands and data can be forwarded from the IO interface 140 as instruction to data signals, via the bus 105, to any of the computer resource assets in the communication system 100.

The driver suite 150 can include an audio driver (not shown) and a video driver (not shown). The audio driver can include a sound card, a sound driver (not shown), an interactive voice response (IVR) unit, or any other device necessary to render a sound signal on a sound production device (not shown), such as for example, a speaker (not shown). The video driver can include a video card (not shown), a graphics driver (not shown), a video adaptor (not shown), or any other device necessary to render an image signal on a display device (not shown).

The live share creator 160 can be arranged to initiate and create a live share session, such as, for example, in response to receiving a live share request from a computing device 10. In an embodiment, in which the communication system 100 is located in any of the computing devices 10, the live share creator 160 can be configured to initiate and create the live share session, such as, for example, in response commands received from the processor 110, in response to input by the participant via the IO interface 140.

The live share creator 160 can be arranged to interact with one or more of the computing devices 10 to initiate a live share session and create a live screenshare, including sending display and sound rendering instructions that, when executed by, for example, a processor running a browser on the computing devices 10 (shown in FIG. 1), causes the device to process display or sound rendering data and display the screenshare, including live AV content feeds and any participant metrics, on display screens and speakers of the computing devices 10. The live share creator 160 can be arranged to assemble each live AV content feed from the participating computing devices, as well as any generated engagement metrics that might be applied during the live share session, for transmission to the participating computing devices 10. The screenshare content can be assembled and packetized based on, for example, an RTP (Real-Time Transport), UDP (User Datagram Protocol) or IP (Internet Protocol) protocol stack and sent to each participating computing device 10.

FIG. 1 shows an example of a computing device 10' provided, by the communication system 100, with a screenshare comprising five live AV content feeds, including AV-1, AV-2, AV-3, AV-4, AV-5, and two live video content feeds V1, V2. In an embodiment, the AV content feeds AV-1, . . . , AV-5, originate from five, different participating computing devices 10 and the two video content feeds V1, V2 originate from the computer resource asset 60 and the image pickup device 50, which can be coupled to, or in at least one embodiment included in, the computing device 10'.

The live share monitor 170 can be arranged to analyze the AV content feed (for example, AV-1, AV-2, AV-3, AV-4, AV-5, V1, or V2), or any sensor data (including, for example, tactile interactivity), on-the-fly and gauge participant engagement in real-time during a live share session. The live share monitor 170 can include one or more computer resource assets. The live share monitor 170 can include a participant monitor unit (PMU) 172, a video monitor unit (VMU) 174, an audio monitor unit (AMU) 176, and a tactile interactivity monitor unit (TIMU) 178. The live share monitor 170 can be arranged to analyze and determine the level of participant engagement in the screenshare, in real-time, and the participant identifier UserID for each participating computing device 10.

The PMU 172 can include a computer resource asset arranged to identify and track the identity of each participant during a live share session. The PMU 172 can be configured to identify each participant and generate, for example, the UserID for the participant (or participant computing device). The UserID can include, for example, a login identification (ID), a username, a telephone number, an email address, an Internet Protocol (IP) address, a media access control (MAC) address, or any other unique identifier of the participant or the computing device 10 used by the participant in the live share session.

The VMU 174 can include a computer resource asset arranged to analyze the video content in the live content feed from the participating computing device 10 and determine a visual cue metric for the participant. The VMU 174 can be configured to perform image analysis, including, for example, eye-tracking analysis, facial gesture analysis, spatial orientation of subject, or any other measurable characteristics that can be indicative of participant engagement.

The VMU 174 can be configured to generate or store a visual engagement baseline. The visual engagement baseline can be created by, for example, capturing AV content for each participant for participating computing device 10 in prior live share sessions and storing it as historical data, or at the beginning of a live share session.

In at least one embodiment, visual engagement baseline ML training datasets and visual engagement baseline ML testing datasets can be built and used to build and train a visual engagement (VE) machine learning (ML) model with visual engagement baselines. Over time, the parametric values in the VE ML model can be updated and adjusted during operation to tune the visual engagement baselines for increased accuracy in predicting the level of engagement by any of the participants.

The VMU 174 can be configured to interact with the VE ML model, or to retrieve the visual engagement baseline from memory (for example, memory 120, shown in FIG. 2) containing historical participant engagement baseline data, including, for example, visual engagement baseline data, audio engagement baseline data, and tactile interface (TI) engagement baseline data. The visual engagement baseline can be applied, by the VMU 174, as a reference metric against which the analyzed video content is compared in determining the visual cue metric for the participant. The visual engagement baseline can be determined, for example, to accommodate the unique conditions of a participant's video feed, such as, for example, camera location, camera quality, lighting, physical position or spatial orientation of the participant.

In an embodiment, the visual engagement baseline can be included in a participant engagement baseline and stored in, for example, memory 120 (shown in FIG. 2), for each participant. The participant engagement baseline can include the visual engagement baseline, an audio engagement baseline, and/or a tactile interaction (TI) engagement baseline.

In an embodiment, the VMU 174 can be configured to store a participant engagement baseline for each participant in a live share session, including the UserID. The memory can include one or more relational databases.

In an embodiment, the VMU 174 can be configured to generate a visual engagement baseline for each participant by, for example, presenting each of the computing devices 10 participating in a live share session with an attention grabber image arranged to capture the attention of each participant. The VMU 174 can be configured to analyze the video content in each of the live AV content feeds in the screenshare when the attention grabber image is displayed on the participant computing devices 10, as well as the video content during a predetermined period of time after the attention grabber image is first displayed. The visual engagement baseline can be applied, by the VMU 174, to calibrate each participant's engagement level during the live share. In an embodiment, each participant's facial expressions can be analyzed and monitored against the corresponding calibrated image to judge the level of engagement, including attentiveness, of each participant.

In various embodiments, the VMU 174 can include a machine learning (ML) platform or a machine learning (ML) model, including the VE model. The ML platform can include, for example, a Word2vec deep neural network, a convolutional architecture for fast feature embedding (CAFFE), an artificial immune system (AIS), an artificial neural network (ANN), a convolutional neural network (CNN), a deep convolutional neural network (DCNN), region-based convolutional neural network (R-CNN), you-only-look-once (YOLO), a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), Naive Bayes, decision trees, logistic model tree induction (LMT), NBTree classifier, case-based, linear regression, Q-learning, temporal difference (TD), deep adversarial networks, fuzzy logic, K-nearest neighbor, clustering, random forest, rough set, or any other machine intelligence platform capable of supervised or unsupervised learning for searching or analyzing video or audio content in live AV content feeds, or sensor data related to tactile interaction by a user at a computing device 10. The ML platform can include the ML model, which can search, analyze and recognize or predict participant engagement in any live share session.

The AMU 176 can include a computer resource asset arranged to analyze the sound content in the live content feed from the participating computing device 10 and determine an audio cue metric for the participant. The AMU 176 can be configured to perform sound analysis including, for example, language (for example, Arabic, Chinese, Dutch, English, French, German, Italian, or Spanish), intensity level (for example, loudness or amplitude), intensity variances, silent periods, pauses between utterances, pitch (or frequency), pitch variances, intonations, intonation variances, articulation, articulation variances, tempo, tempo variances, accent, accent variances, voice stress, attempts by a participant to seize the conversational floor, speaker dominance, when a participant talks over another participant, conversational balance, when a participant interrupts another participant, noise (sporadic or continuous), or any other sound characteristic that can be indicative of participant engagement. The AMU 176 can be configured to determine the audio cue metric on-the-fly, and in real-time, based on the sound analysis.

The AMU 176 can be configured to monitor or learn participation or audible reactions made during a live share session. The AMU 176 can be configured to determine or predict when a participant is reacting to screenshare content in an audible manner. For example, the AMU 176 can be configured to determine the amount of time each participant is talking, as well percentage for each participant with respect to other participants or over the duration of the live share session. Accordingly, the AMU 176 can determine if, for example, any participant is not audibly reacting during a screenshare for a predetermined amount of time or duration of the live share session.

The AMU 176 can be configured to generate or store an audio engagement baseline, which can be captured, for example, in prior live share sessions and stored as historical data, or at the beginning of a live share session.

In various embodiments, the AMU 176 can include an ML platform or ML model arranged to analyze sound content in the live AV content received from participant computing devices 10 during a live share session.

In at least one embodiment, audio engagement baseline ML training datasets and audio engagement baseline ML testing datasets can be built and used to build and train an audio engagement (AE) ML model with audio engagement baselines. Over time, the parametric values in the AE ML model can be updated and adjusted during operation to tune the audio engagement baselines for increased accuracy in predicting the level of engagement by any of the participants.

The AMU 176 can be configured to interact with the AE ML model, or to retrieve the audio engagement baseline from the memory (for example, memory 120, shown in FIG. 2) containing the historical participant engagement baseline data, including, audio engagement baseline data. The audio engagement baseline can be applied, by the AMU 176, as a reference metric against which the analyzed sound content is compared in determining the audio cue metric for the participant. The audio engagement baseline can be determined, for example, to accommodate the unique conditions of a participant's audio feed, such as, for example, microphone location, microphone quality, surrounding sound or noise, physical position or spatial orientation of the participant with respect to the microphone.

The TIMU 178 can include a computer resource asset that is configured to detect and analyze, in real-time, tactile sensor data and determine tactile interactions at the participant computing device in a live share session. The tactile interaction can include any interaction with the computing device by the participant, such as, for example, user interaction with a user interface of the computing device, such as, for example, a mouse, stylus, keyboard, touchscreen, or IVR (voice response unit). The TIMU 178 can be configured to detect and monitor user activity at each participant computing device 10.

In various embodiments, the TMU 178 can include an ML platform or ML model arranged to analyze tactile sensor data from a computing device 10 during a live share session. In at least one embodiment, tactile engagement baseline ML training datasets and tactile engagement baseline ML testing datasets can be built and used to build and train a tactile engagement (EE) ML model with tactile engagement baselines. Over time, the parametric values in the TE ML model can be updated and adjusted during operation to tune the tactile engagement baselines for increased accuracy in predicting the level of engagement by any of the participants.

The TIMU 178 can be configured to interact with the TE ML model, or to generate or store a TI engagement baseline, which can be captured, for example, in prior live share sessions and stored as historical data, or at the beginning of a live share session. The TIMU 178 can be configured to retrieve the TI engagement baseline from the memory (for example, memory 120, shown in FIG. 2) containing the historical participant engagement baseline data, including, TI engagement baseline data. The TI engagement baseline can be applied, by the TIMU 178, as a reference metric against which the detected tactile interactivity can be compared in determining a tactile interactivity (TI) cue metric for the participant.

In various embodiments, the TIMU 178 can be configured to interact with the TE ML model, or to generate or store a TI engagement baseline.

In at least one embodiment, the TIMU 178 can be configured (or trained) to analyze sensor data, including user interface data such as, for example, data related to participant interaction with a mouse, keyboard, or touchscreen. The sensor data (including, for example, mouse, keyboard and touch actions) can be analyzed to determine or predict user attentiveness for each participant. The TIMU 178 can be configured (or trained) to analyze sensor data and determine or predict if a participant is heeding a presenter's request to point or move their cursor to a particular area of the screen, or how much time passes between some type of user interactivity with their device.

In certain embodiments, the TIMU 178 can be configured or trained to analyze state data from each computing device 10 and predict participant engagement. State data can include, for example, data indicating whether the presentation/session Window is open, closed, minimized, maximized, or if other content is present on the display.

In various embodiments, the VMU 174, AMU 176, and TIMU 178 can be configured (or trained) to interact and analyze visual, sound, and tactile cues to determine or predict the state of each participant, including, for example, mood, happiness, sadness, concern, worry, inquisitiveness, or boredom.

In at least one embodiment, the live share monitor 170 can include an engagement level (EL) reporting unit (not shown). The live share monitor 170 can be configured to receive instructions by, for example, a meeting/session owner in advance, customizing the means for analysis by session. For example, the meeting/session owner can, by means of their computing device 10, select the sensor input data to be analyzed in advance of a live share session, such as, for example, by selecting on a GUI whether the live share monitor 170 is to analyze video, audio, tactile, or any combination thereof, for participant engagement determination.

In at least one embodiment, video, audio, tactile, or a combination of the foregoing, can be monitored, analyzed, measured and recorded during a live share session and the engagement level reported by the EL reporting unit at the conclusion of the session for each participant.

The EL reporting unit can be configured to report the engagement level for each participant in real-time as a live share session proceeds.

The EL reporting unit can be configured to report the engagement levels on the computing device of the owner of the presentation/session, for example, in the form of time-based graphs.

In an alternative embodiment, the EL reporting unit can be provided as a computer resource asset in the screenshare renderer 180.

The screenshare renderer 180 can be configured to render and, via the transmitter, transmit a screenshare, including AV content to each computing device 10 participating in the screenshare. The screenshare renderer 180 can be configured to receive a request from a participant and send engagement level rendering instructions and engagement level rendering data to the computing device 10 from which the request was received.

The screenshare renderer 180 can include one or more computer resource assets configured to interact with the live share monitor 170 and receive participant engagement metrics for each participant, including the visual cue metric, audio cue metric and TI cue metric, and send screenshare rendering instructions and data to a participant computing device 10. The receiving participant computing device 10 can execute the screenshare rendering instructions and display a live screenshare on a display device and reproduce corresponding live sound content on a sound output device (for example, speaker).

The screenshare renderer 180 can be configured to allow a participant to select or customize the way the participant engagement metrics are rendered on participant's computing device 10. For example, the participant can set to have participant engagement metrics presented on the computing device 10 at the conclusion of the live share session, or in real-time as the live share progresses.

Figure 4:
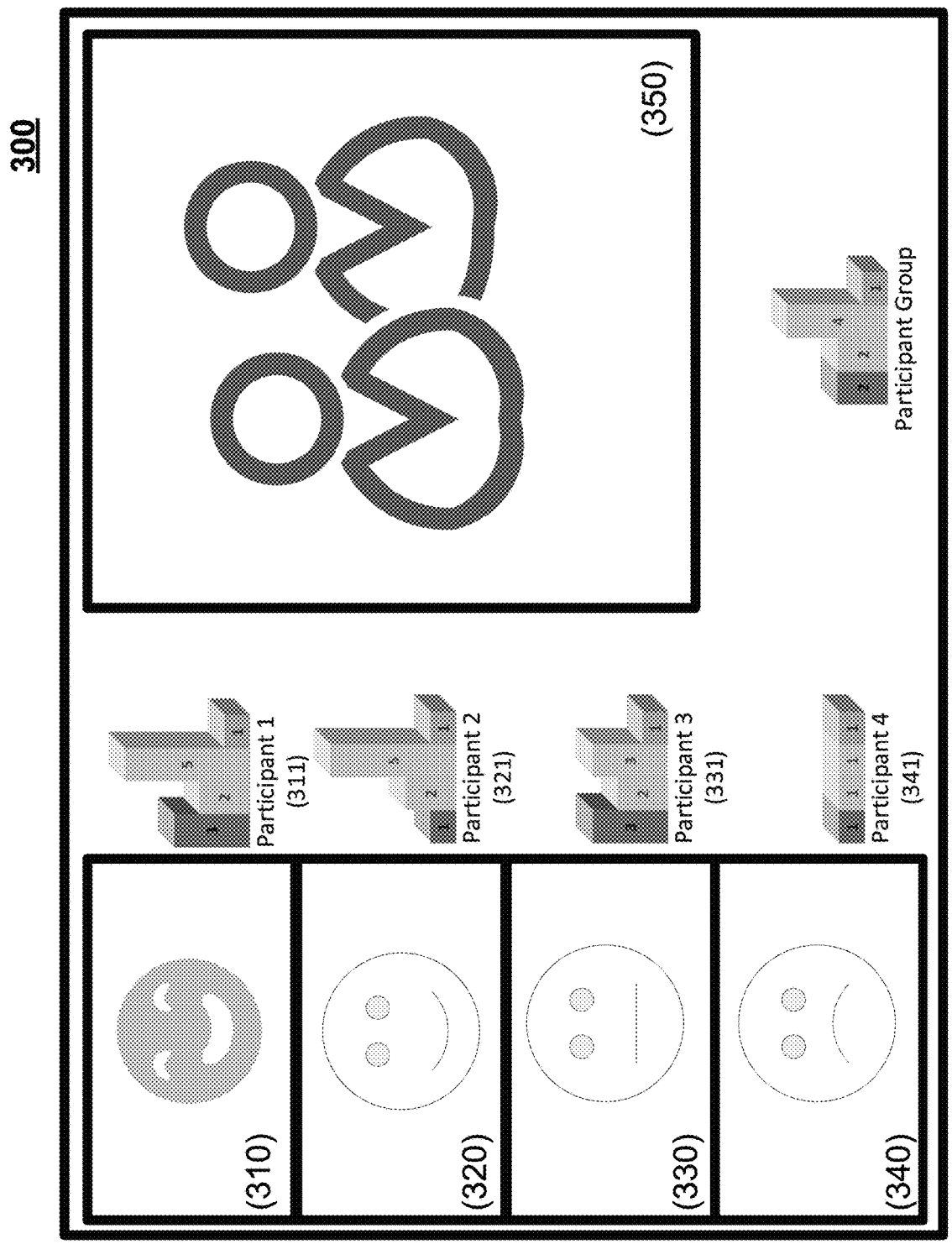
FIG. 4 shows a nonlimiting embodiment of a display screen of a computing device, configured according to the principles of the disclosure.

FIG. 4 shows an example of a screenshare 300 that can be rendered on the display device of a live share participant 350. In this example, the participant 350 selected to have the participant engagement metrics 311, 321, 331, 341 displayed as bar-graphs for respective participants 310, 320, 330, 340. As seen, the participant 350 also selected to have a participant group engagement metric displayed, which can include an average of the participant engagement metrics 311, 321, 331, 341.

In certain embodiment, rendering of the participant engagement metrics can be selected such that the metrics are presented in the form of, for example, time-based graphs, pie-charts, or any displayable graphic that can convey participant engagement based on the corresponding participant engagement metrics.

The screenshare renderer 180 can be configured to provide screenshare rendering instructions as, for example, unique commands (for example, HTML, CSS or JavaScript commands) that, when executed by a processor, cause the processor to drive and control the pixels on a display device, or drive an audio device (for example, speaker), to reproduce the sound content during in real-time during a live share. The screenshare rendering instructions can cause the processor to use screenshare data, including participant engagement metrics and participant identification information (UserID), when reproducing the screenshare on a display screen or audio output device. The screenshare rendering instructions can include commands for reproducing each pixel or sound according to a predetermined rule, including, for example, color, hue, saturation, intensity, pixel density, resolution, pixel address, amplitude, pitch, and timbre.

In an embodiment, the communication system 100 can include one or more controllers (not shown), including a high-speed controller that can manage bandwidth-intensive operations for the communication system 100, and a low-speed controller that can manage lower bandwidth-intensive operations. Such allocation of functions is exemplary only. In one implementation, the high-speed controller is coupled to a portion of the memory 120, the display screen (for example, through a graphics processor or accelerator), and to high-speed expansion ports (not shown), which can be arranged to accept various expansion cards (not shown). In the implementation, the low-speed controller is coupled to another portion of the memory 120 and one or more low-speed expansion ports (not shown). The low-speed expansion ports, which can include various communication ports (for example, USB) can be coupled to one or more input/output devices (not shown), such as a keyboard, a pointing device, a scanner, or a networking device such as a switch or router, for example, through a network adapter.

The communication system 100 can be implemented in a number of different forms, such as, for example, seen in FIGS. 1 and 2. For example, it can be implemented as a server 30 (shown in FIG. 1), or multiple times in a group of such servers. It can also be implemented as part of a rack server system. In addition, it can be implemented in a personal computer such as a laptop computer. Alternatively, computing resource assets from the communication system 100 can be combined with other computing resource assets in a computing device 10. Each of such computing resource assets can contain one or more of the devices, and an entire system may be made up of multiple devices communicating with each other through communication links.

The computing device 10 can reproduce live AV content feeds on its display device (shown in FIG. 1), including any participant engagement metrics that that might be generated on-the-fly, in real-time, or at a different time than the live share session, such as, for example, at the conclusion of the session, after the session, or at the beginning or during another live share session. For instance, the computing device 10 can display live AV content (shown in FIG. 1) and participant engagement metrics for each participant, as seen, for example, in FIG. 4.

In an embodiment, the screen rendering instructions and data transmitted to, for example, a computing device 10 that initiated live share session, or the owner of the presentation or session, can include engagement level rendering instructions and data. The screen rendering instructions can include engagement level rendering instructions, and the screen rendering data can include engagement level rendering data.

In an embodiment, the screen rendering instructions and data can include markup language for identifying participant engagement metrics and creating structured documents, including images, text, links, sounds, and other objects. The markup language can include a plurality of tags for displaying participant engagement metrics and AV content on the display screens of one or more of the computing devices 10 participating in the live share. The markup language can include, for example, Standard Generalized Markup Language (SGML), Scalable Vector Graphics (SVG), HTML, Extensible Markup Language (XHTML or XML), XML User Interface Language (XUL), or LaTeX. The markup language can be provided as a markup language file that can be executed by, for example, a web browser running in the computing device 10 to render the participant engagement metrics on the computing device 10.

The screenshare rendering instructions and data can include a style sheet language for providing rules for stylistics and for describing the presentation of the content and document with the markup language, such as, for example, the markup language file. The style sheet language can include, for example, colors, fonts, layouts, and other stylistic properties. The style sheet language can include, for example, CSS, Document Style Semantics and Specification Language (DSSSL), or Extensible Stylesheet Language (XSL). The style sheet language annotations can be provided as a style sheet language file. Alternatively, the style sheet language can be incorporated into the file containing the markup language.

The screenshare rendering instructions and data can include scripting language instructions to create interactive effects related to the markup language or style sheet language. The scripting language can include, for example, Bash (for example, for Unix operating systems), ECMAScript (or JavaScript) (for example, for web browsers), Visual Basic (for example, for Microsoft applications), Lua, or Python. The scripting language instructions can include instructions that when executed by, for example, the web browser on the computing device 10 effect display or reproduction of AV content and participant engagement metrics. The scripting language instructions can be provided as a scripting language file. Alternatively, the scripting language instructions can be incorporated into the file containing the markup language.

The screenshare rendering instructions and data can include a document object model (DOM) such as for HTML or XML (for example, DOM5 HTML) that can create object-oriented representations of the content or documents that can be modified with the scripting language instructions. A DOM includes a cross-platform and language-independent convention for representing and interacting with objects in HTML, XHTML/XML, SGML, SVG, or XUL. As used herein, a document can refer to the DOM's underlying document.

The screenshare rendering instructions and data can be configured to be executable by the computing device 10 (shown in FIG. 1), or the processor 100 (shown in FIG. 2), and can follow a model-view-controller (MVC) design pattern for user interfaces. According to the MVC design pattern, the screenshare rendering instructions or data can be divided into three areas of responsibility, including: (1) the Model, which includes the domain objects or data structures that represent the application's state; (2) the View, which observes the state and generates an output to the users; and, (3) the Controller, which translates user input into operations on the model.

The communication system 100 can be arranged to receive a live AV content feed from each computing device 10 participating in a live share and to provide any or all live AV content feeds to each participating computing device 10. The live AV content feeds can be received from the communication system 100 by each participating computing device 10 and displayed on a display screen and/or reproduced on a speaker device. In this example, the live AV content can include, for example, a display container for each live AV content feed, as shown in the nonlimiting example depicted in FIG. 1. The live share, including live AV content feed(s) and any participant engagement metrics, can be reproduced by a participating computing device by means of, for example, a browser application running on the computing device 10. The browser application can, when executed by the computing device 10, convert, for example, HyperText Markup Language (HTML), Cascading Style Sheets and JavaScript into a working website, webpage or live share display that can be interacted with by an operator of the computing device 10, such as, for example, through a user interface. The live share can include, in addition to the live AV content and associated participant engagement metrics, a participant identifier for each live AV audio content feed and participant engagement metric.

Figure 3:
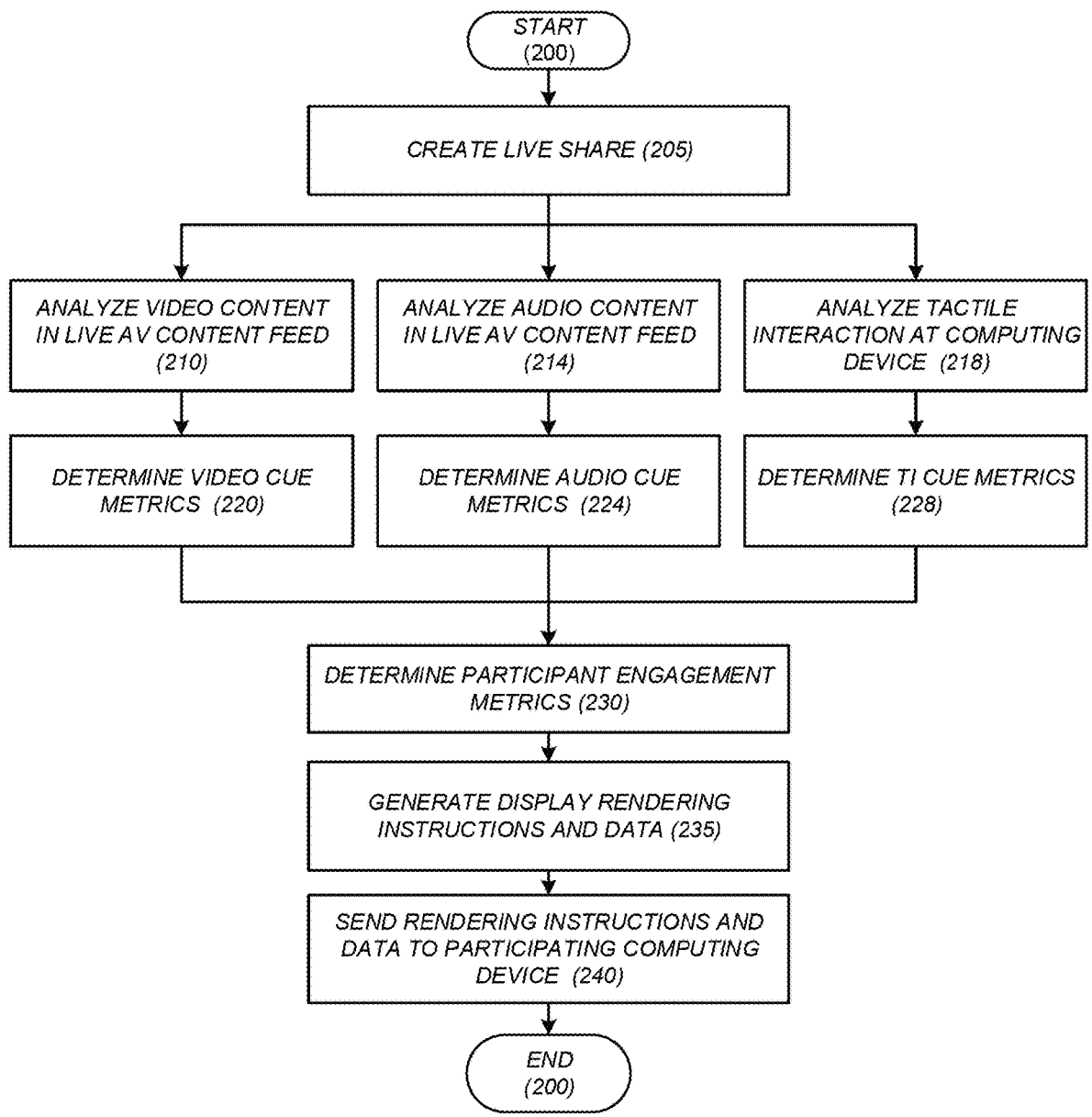
FIG. 3 depicts a nonlimiting embodiment of a computer-implemented method, according to the principles of the disclosure.

FIG. 3 shows an embodiment of a participant engagement monitoring process 200 that can be performed by the communication system 100 (shown in FIG. 1 or 2). In an embodiment, the process 200 can be carried out by the processor 110 (shown in FIG. 2). The memory 120 (shown in FIG. 2) can include a non-transitory computer-readable medium containing computer program instructions or executable code that, when executed by the processor 110, can cause the communication system 100 to perform each of the steps 210 to 235 (shown in FIG. 3).

Referring to FIGS. 1-4 contemporaneously, a live share session can be initiated or created by the live share creator 160 in response to a request or instruction from a computing device 10, or sua sponte, such as, for example, at a scheduled time (Step 205).

In creating the live share (Step 205), two or more live AV content feeds can be received by the communication system 100 from two or more computing devices 10 participating in the live share ("participant computing devices") and combined in a screenshare. The live share can be hosted by the communication system 100, with each of the live AV content feeds provided on a live share board in the screenshare. The screenshare can include, for example, a background screen with alterable containers, each configured to render a live AV content feed from a unique participant computing device 10. The screenshare can include, for example, a main screen similar to that of state-of-the art videoconference systems, except that the main screen can be configured to be rendered (or displayed) as near-infinite in width, height, or depth, such as, for example, limited only by the capabilities of the computer resource asset(s) in the communication system 100, and that all, or a portion of all, AV content can be annotatable in real-time. The communication system 100 can be configured to allow a participant to manipulate any element or article in the screenshare, such as, for example, to move an element or article anywhere on the screenshare, flip, turn, spin or otherwise alter a shape, size, or appearance of the element or article on the screenshare. The communication system 100 can be configured to include customizable settings for each participant such that, for example, attributes of the screenshare can be rendered differently by one or more of the participating computing devices.

In an embodiment, the main screen of the screenshare can be arranged such that, when the screenshare is rendered on a participant computing device 10, the participant can (for example, using a mouse) move up, down, and sideways, or into or away from any point on the live share board, providing the participant with an experience of an infinitely wide, high and deep screenshare—for example, much like a person standing on the earth and being able to move in any direction with respect to the earth's surface, including, for example, forward, sideways, up, or down.

The live share creator 160 can be arranged to aggregate the live AV content feed from each participant computing device 10 in the screenshare, including any participant engagement metrics determined in real-time (or at a previous time), and the feed screenshare to participant computing device(s) 10.

As the live share proceeds in real-time, the video content (Step 210) and audio content (Step 214) in the live AV content feed, and the tactile interaction by a participant at the participant's computing device (Step 218), can be analyzed on-the-fly, for example, by the live share monitor 170, and monitored in real-time for each participating computing device (Steps 210, 214, 218). The analyzed video content, audio content and tactile interaction can be compared to the corresponding visual engagement baseline, audio engagement baseline, and TI engagement baseline, respectively, to determine video cue metrics (Step 220), audio cue metrics (Step 224) and TI cue metrics (Step 228), respectively.

The video cue metrics, audio cue metrics and TI cue metrics can be aggregated to determine participant engagement metrics for the participating computing device 10 (or participant) (Step 230). In an embodiment, the participant engagement metrics can include all, or fewer than all, of the video, audio, and TI cue metrics.

The participant engagement metrics can be encoded and display rendering instructions and data generated, for example, by the screenshare renderer 180 (Step 235), and sent to the participating computing device 10 (Sep 240), where the screenshare can be rendered on a display device, including the participant engagement metrics for any of the participants in the live share.

In an embodiment comprising HTML5, the communication system 100 can be configured to provide, for example, an audio tag (for example, an instruction to embed an audio file/link in the displayed screen and how to play it), a video tag (for example, an instruction to embed video in the displayed screen and how to play it), a source tag (e.g., can be used with audio or video to identify a source for the audio or video), an embed tag (for example, an instruction to embed specified media type for content that might lack support within other media elements), a canvas tag (for example, an instruction to set aside part of the display screen), and an svg tag (for example, an instruction to embed vector graphics (for example, object, text, overlay and/or background) encoded with SVG markup language, to allow graphics (for example, objects, text, overlay and/or background) to be scaled dynamically to the area and shape of the display screen without losing any graphic quality). As understood by those skilled in the art, the encoded annotations can include other tags that, when referenced by, for example, a style sheet language, cause the communicating device 10 to render the live share AV content together with participant engagement metrics in any location, layout, size, shape, color, texture, font, special effect, backdrop, or other visual or auditory characteristic.

The screenshare rendering instructions and data can include computer instructions and data necessary to display the participant engagement metrics according to a request or instruction from a computing device 10. The screenshare renderer 180 can be configured to package and send screenshare rendering instructions and participant engagement metrics data such that each participant metric can be rendered or reproduced, for example, by a computing device 10, as instructed or requested by the participant. The screenshare renderer 180 can be configured to provide all rendering instructions and data necessary for rendering the screenshare in real-time with participant engagement metrics determined on-the-fly, in real-time, during the live share.

In various embodiments, the live share monitor 170 can be configured to perform facial analysis to determine whether participants are "paying attention" by comparing their current expression with an "attentive baseline" captured at the beginning of the session. The baseline can accommodate the unique conditions of a user's video feed (for example, camera location, camera quality, lighting, physical position of the user). The live share monitor 170 can present the user with an "attention grabber" image, and then capture that image of each user. This image can then be used as a calibration of everyone's "attentive" expression for this particular session. During the session, the user's facial expressions can be monitored against the calibrated image to judge attentiveness throughout.

The live share monitor 170 can perform another factor of analysis—for example, audible interaction analysis. Audible interaction analysis can be performed in addition to visual image analysis. The second factor can involve participation or audible reactions made during the session. This can then tell when participants are reacting to content in an audio manner. This can tell what percentage (%) of the time participants are talking. This can tell if participants are not audibly reacting for long periods.

The live share monitor 170 can perform another factor of analysis—tactile interactivity (for example, mouse, keyboard, touch) analysis. Mouse, keyboard and touch actions can be measured and analyzed for user attentiveness. For example, the analysis can detect whether the presentation/session display window is open, closed, maximized, minimized, or there is other content on their display. A determination can be made whether participants heed a presenter's request to point or move their cursor to a particular area of the screen. The live share monitor 170 can detect and record how much time passes between some type of user interactivity with their device.

The live share monitory 170 can analyze mood/tonal audio/video cues. From facial expression recognition and audio capture, it can determine the mood of the participant. This can determine happiness, worry, inquisitiveness, concern or boredom.

The analysis factors can be selected by a meeting/session owner in advance, customizing the means for analysis by session. Measurements of the selected factors can be collected during the session and reported at the conclusion. Alternatively, real-time measurements can be presented to the owner throughout the session in the form of time-based graphs.

The communication system 100 can provide feedback on how well participants are actually engaged in an online session, which can be of extraordinary benefit. For example, in academia implementation, the communication system 100 can tell if students are paying attention, if an audience is reacting well to a presentation, or if some of the participants are chronically low in participation.

The terms "a," "an," and "the," as used in this disclosure, mean "one or more," unless expressly specified otherwise.

The terms "annotate," "annotating," "annotated," and variations thereof, as used in this disclosure, mean to draw on, mark up, alter or manipulate live AV content as it appears or, in the case of audio content, is reproduced in real-time on one or more computing devices during live share of AV content between two or more computing devices.

The term "annotation," as used in this disclosure, means a line, a circle, an object, an article, a drawing, a mark, a special effect, or anything else that can be applied, superimposed, added or incorporated into live AV content in real-time during a live share.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communication device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 302.11, DECT, 0G, 1G, 2G, 3G, 4G, 5G, or 6G cellular standards, or Bluetooth. A communication link can include, for example, an RS-232, RS-422, RS-485, or any other suitable serial interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (C), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, Cs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more computing resource processes.

The term "computing resource process," as used in this disclosure, means a computing resource that is in execution or in a state of being executed on an operating system of a computing device. Every computing resource that is created, opened or executed on or by the operating system can create a corresponding "computing resource process." A "computing resource process" can include one or more threads, as will be understood by those skilled in the art.

The terms "computer resource asset" or "computing resource asset," as used in this disclosure, means a computing resource, a computing device or a communicating device, or any combination thereof.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 302.11, DECT, 0G, 1G, 2G, 3G, 4G, or 5G cellular standards, or Bluetooth.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The term "transmission," "transmit," "sent" or "send," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

What is claimed is:

1. A communication system for a live share session comprising a screenshare that includes audio-video content from one or more participating computing devices, including a first live audio-video content feed from a first participating computing device and a second live audio-video content feed from a second participating computing device, the system comprising:
   a receiver configured to receive at least one of the first live audio-video content feed from the first participating computing device and the second live audio-video content feed from the second participating computing device;
   a processor communicatively coupled to the receiver, the processor being configured to:
      initiate, by a live share creator, a live share session that includes the first live audio-video content feed and the second live audio-video content feed;
      analyze, by a live share monitor, content in at least one of the first live audio-video content feed and the second live audio-video content feed against a visual engagement baseline, an audio engagement baseline, and a tactile engagement baseline;
      calculate, by the live share monitor, participant engagement metrics including a video cue metric based on the visual engagement baseline, an audio cue metric based on the audio engagement baseline, and a tactile interactivity cue metric based on the tactile engagement baseline;
   a screenshare renderer configured to render the screenshare on a display device, the screenshare including the audio-video content from the one or more participating computing devices and the participant engagement metrics, including the video cue metric, the audio cue metric, and the tactile interactivity cue metric; and
   a transmitter communicatively coupled to the processor, wherein the transmitter is configured to packetize and send the participant engagement metrics and at least one of the first audio-video content feeds and the second audio-video content feeds to a communicating device.

2. The communication system in claim 1, wherein the communicating device comprises a third participating computing device.

3. The communication system in claim 1, wherein the communicating device comprises the first participating computing device.

4. The communication system in claim 1, wherein:
   the processor is configured to generate, by the screenshare renderer, engagement level rendering instructions and engagement level rendering data; and
   the transmitter is configured to packetize and send the engagement level rendering instructions and the engagement level rendering data to the communicating device to display at least one of the video cue metric, the audio cue metric, and the tactile interactivity metric.

5. A computer-implemented method for a live share session comprising a screenshare that includes live audio-video content from one or more participant computing devices, including a first live audio-video content feed from a first participating computing device and a second live audio-video content feed from a second participating computing device, the method comprising:
   receiving at least one of the first live audio-video content feed from the first participating computing device and the second live audio-video content feed from the second participating computing device;
   initiating, by a live share creator, a live share session that includes at least one of the first live audio-video content feed and the second live audio-video content feed;
   analyzing, by a live share monitor, content in at least one of the first live audio-video content feed and the second live audio-video content feed against a visual engagement baseline, an audio engagement baseline, and a tactile engagement baseline;
   calculating, by the live share monitor, participant engagement metrics including a video cue metric based on the visual engagement baseline, an audio cue metric based on the audio engagement baseline, and a tactile interactivity cue metric based on the tactile engagement baseline;
   rendering, by a screenshare renderer, the screenshare including the audio-video content from the one or more participating computing devices and the participant engagement metrics, including the video cue metric, the audio cue metric, and the tactile interactivity cue metric; and transmitting the participant engagement metrics, including the video cue metric, the audio cue metric, and the tactile interactivity cue metric, and at least one of the first audio-video content feeds and the second audio-video content feeds to a communicating device.

6. The computer-implemented method in claim 5, wherein the communicating device comprises the first participating computing device.

7. The computer-implemented method in claim 5, wherein the communicating device comprises a third participating computing device.

8. The computer-implemented method in claim 5, the method further comprising:
generating, by the screenshare renderer, engagement level rendering instructions and engagement level rendering data; and
transmitting the engagement level rendering instructions and the engagement level rendering data to the communicating device to display at least one of the video cue metric, the audio cue metric, and the tactile interactivity metric.

9. A non-transitory computer-readable medium for a live share session comprising a screenshare that includes live audio-video content from one or more participant computing devices, including a first live audio-video content feed from a first participating computing device and a second live audio-video content feed from a second participating computing device, the computer-readable medium comprising instructions that, when executed by a processor, cause the processor to perform a method comprising:
receiving at least one of the first live audio-video content feed from the first participating computing device and the second live audio-video content feed from the second participating computing device;
initiating, by a live share creator, a live share session that includes at least one the first live audio-video content feed and the second live audio-video content feed;
analyzing, by a live share monitor, content in at least one of the first live audio-video content feed and the second live audio-video content feed against a visual engagement baseline, an audio engagement baseline, and a tactile engagement baseline;
calculating, by the live share monitor, a video cue metric based on the visual engagement baseline, an audio cue metric based on the audio engagement baseline, and a tactile interactivity cue metric based on the tactile engagement baseline;
rendering, by a screenshare renderer, the screenshare including the audio-video content from the one or more participating computing devices and the participant engagement metrics, including the video cue metric, the audio cue metric, and the tactile interactivity cue metric; and
transmitting the participant engagement metrics and at least one of the first audio-video content feeds and the second audio-video content feeds to a communicating device.

10. The non-transitory computer-readable medium in claim 9, wherein the communicating device comprises the first participating computing device or a third participating computing device.

11. The non-transitory computer-readable medium in claim 9, wherein the method further comprises:
generating, by the screenshare renderer, engagement level rendering instructions and engagement level rendering data; and
transmitting the engagement level rendering instructions and the engagement level rendering data to the communicating device to display at least one of the video cue metric, the audio cue metric, and the tactile interactivity metric.

* * * * *